(12) United States Patent
Russo

(10) Patent No.: US 8,775,453 B2
(45) Date of Patent: Jul. 8, 2014

(54) SYSTEM AND METHOD FOR REDUCING MEMORY USAGE OF TREE-BASED DATA STRUCTURES

(75) Inventor: Mark A. Russo, Belle Mead, NJ (US)

(73) Assignee: CA, Inc., Islandia, NY (US)

( * ) Notice: Subject to any disclaimer, the term of this patent is extended or adjusted under 35 U.S.C. 154(b) by 629 days.

(21) Appl. No.: 12/046,320

(22) Filed: Mar. 11, 2008

(65) Prior Publication Data

US 2008/0243881 A1    Oct. 2, 2008

Related U.S. Application Data

(60) Provisional application No. 60/908,320, filed on Mar. 27, 2007.

(51) Int. Cl.
*G06F 7/00* (2006.01)
*G06F 17/30* (2006.01)

(52) U.S. Cl.
USPC ............................ 707/758; 707/692; 707/703

(58) Field of Classification Search
None
See application file for complete search history.

(56) References Cited

U.S. PATENT DOCUMENTS

| | | | | |
|---|---|---|---|---|
| 3,577,185 A | * | 5/1971 | Belady | 711/159 |
| 6,470,347 B1 | * | 10/2002 | Gillam | 707/999.101 |
| 7,321,898 B1 | * | 1/2008 | Luo et al. | 707/999.102 |
| 7,450,084 B2 | * | 11/2008 | Fuller et al. | 710/104 |
| 7,512,610 B1 | * | 3/2009 | Barabas et al. | 707/999.1 |
| 7,600,008 B1 | * | 10/2009 | Greene | 709/223 |
| 7,610,212 B2 | * | 10/2009 | Klett et al. | 705/7.12 |
| 2003/0115445 A1 | * | 6/2003 | Heller | 713/2 |
| 2004/0083227 A1 | * | 4/2004 | Yocom | 707/101 |
| 2006/0075265 A1 | * | 4/2006 | Hamaoka et al. | 713/300 |
| 2007/0016373 A1 | * | 1/2007 | Hunter et al. | 702/19 |
| 2008/0065663 A1 | * | 3/2008 | Farlee et al. | 707/101 |

OTHER PUBLICATIONS

Nilsson (Balanced Binary Tree, codeguru, Jan. 2, 2002.*
Johnson (Alan Johnson, map to vector, Bytes IT Community, Jul. 23, 2005).*

* cited by examiner

*Primary Examiner* — Fred I Ehichioya
*Assistant Examiner* — Jau-Shya Meng
(74) *Attorney, Agent, or Firm* — Baker Botts, L.L.P.

(57) ABSTRACT

A system and method for reducing memory usage is disclosed. The system and method include populating a first container with original data. The first container has a tree-based data structure that includes a plurality of nodes and a plurality of pointers. A block of memory is allocated to a second container that has an array-based data structure. The original data is copied from the first container to the second container. The original data, the plurality of nodes, and the plurality of pointers may be deleted from the first container.

27 Claims, 8 Drawing Sheets

SYSTEM AND METHOD FOR REDUCING MEMORY USAGE OF TREE-BASED DATA STRUCTURES

RELATED APPLICATION

This application claims the benefit of U.S. Provisional Application Ser. No. 60/908,320 filed Mar. 27, 2007, entitled System and Method for Reducing Memory Usage of Tree-Based Dictionary and Set Data Structures, which is hereby incorporated by reference.

TECHNICAL FIELD OF THE INVENTION

The present invention relates generally to memory usage, and more particularly to reducing memory usage of tree-based data structures.

BACKGROUND OF THE INVENTION

Computer data may be contained in a variety of data structures. For example, modeling data may be contained in a set data structure or a map data structure. A set data structure is a collection of objects or keys where the object or key can only exist once in the set. A map data structure is similar to a set data structure except that along with a collection of keys, a map data structure includes additional data. That is, the key of a map data structure is mapped to a value. For example, a map data structure container may contain a key that is a two-character abbreviation of a state and that key is mapped to a value that is the complete state name. The key data structure and the map data structure may utilize a tree-based data structure.

Tree-based data structures may allow fast population and fast retrieval of data. However, tree-based data structure may require substantial memory to store data. Much of the memory allocated to a tree-based data structure may be overhead. That is, the memory may be allocated to support the tree structure and other overhead required by the operating system in addition to the memory allocated for the data itself. For example, a map data structure may have 4 bytes allocated for the key and 4 bytes allocated to the value associated with the key. Thus, each entry in a container holding a map data structure may be 8 bytes of actual data. However, 20 bytes of overhead memory may be allocated to each entry.

SUMMARY OF THE INVENTION

In accordance with a particular embodiment of the present invention, a method for reducing memory usage includes populating a first container with original data. The first container has a tree-based data structure that includes a plurality of nodes and a plurality of pointers. A block of memory is allocated to a second container that has an array-based data structure. The original data is copied from the first container to the second container. The original data, the plurality of nodes, and the plurality of pointers may be deleted from the first container.

Technical advantages of particular embodiments of the present invention may include original data that is stored in a container with an array-based data structure. Storing data in an array-based data structure may provide relatively significant reduction in overhead memory allocation. With this memory reduction, it may be easier to work with files from a disk that contain large amounts of data that would otherwise exceed the memory limits of an operating system.

Further technical advantages of embodiments of the present invention may include storing data in a container where overhead memory allocation is incurred once for the entire container, as opposed to memory overhead for each entry in the container.

Still further technical advantages of particular embodiments of the present invention may include a seamless and transparent reduction in memory allocation through the use of an array-based data structure. The reduction may be seamless and transparent to a user of an application.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of embodiments of the invention will be apparent from the detailed description taken in conjunction with the accompanying drawings in which.

DETAILED DESCRIPTION OF THE INVENTION

Particular embodiments of the invention and its advantages are best understood by reference to FIGS. 1 through 7 wherein like numbers refer to same and like components.

Figure 1:
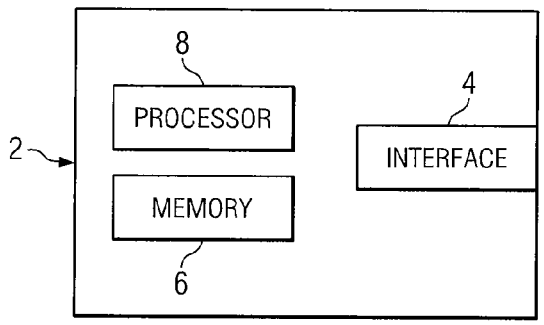
FIG. 1 is a block diagram illustrating a system for reducing memory usage in accordance with an embodiment of the present invention.

FIG. 1 is a block diagram illustrating a system 2 that may be used to reduce memory allocation. The system includes an interface 4, memory 6, and one or more processors 8. These components may work together to allow reduction of overhead memory associated with a tree-based data structure. While system 2 is depicted a single device, in particular embodiments system 2 may be incorporated into other devices and/or its components may be spread out through a network.

Processor 8 may be a microprocessor, controller, or any other suitable computing device, resource, or combination of hardware, software and/or encoded logic operable to provide, either alone or in conjunction with other components of system 2 (e.g., memory 6) memory reduction functionality. Such functionality may include providing various features discussed herein to a user. For example, processor 8 may allocate a block of memory to a container that has an array-based data structure. It may also determine whether desired data is included in the array-based container.

Memory 6 may be any form of volatile or non-volatile memory including, without limitation, magnetic media, optical media, random access memory (RAM), read-only memory (ROM), removable media, or any other suitable local or remote memory component. Memory 6 may store data in a tree-based data structure or an array-based data structure. In accordance with an embodiment of the present invention, the usage of memory 6 may be reduced providing an increased ability to work with files containing a large amount of data.

Interface 4 may comprise any hardware, software, or encoded logic needed to be able to send and receive information with other components, such as a memory 6. For example, interface 4 may receive original data in a container having a tree-based data structure. It may receive additional data in a tree-based data structure after the original data is deleted.

Figure 2:
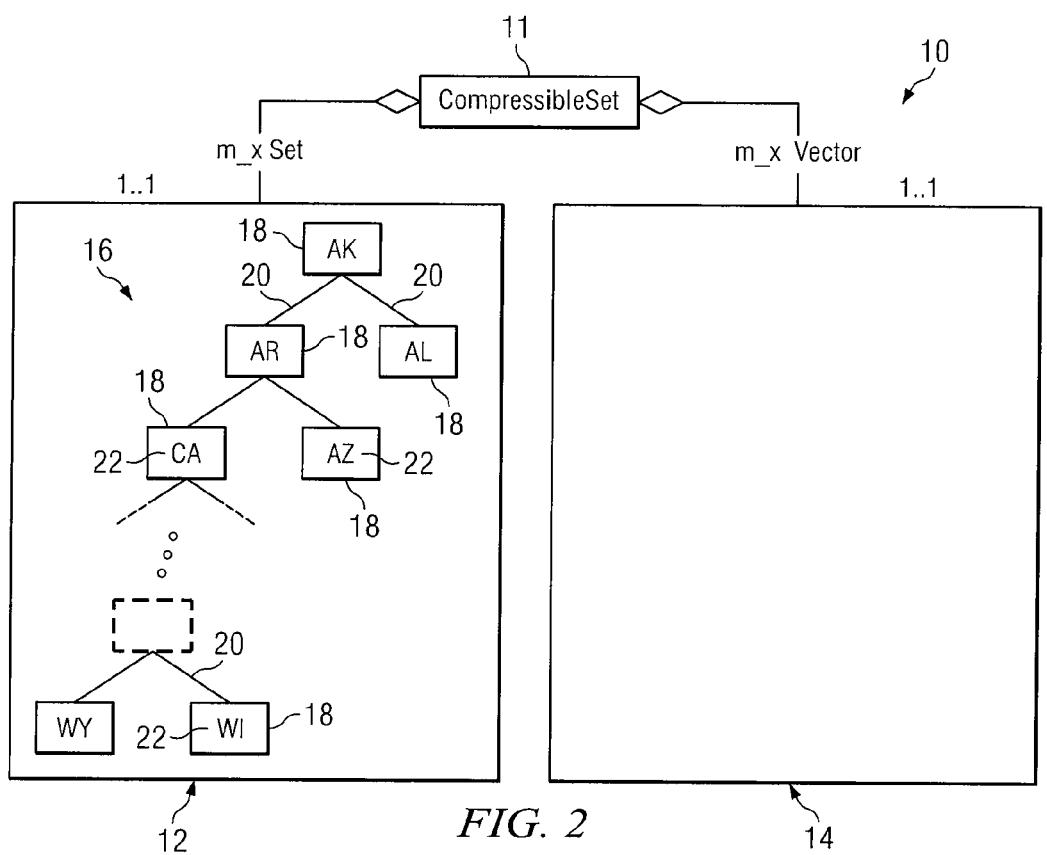
FIG. 2 illustrates a unified modeling language diagram of a compressible set structure with data in a set container in accordance with an embodiment of the present invention.

FIG. 2 illustrates CompressibleSet structure 10 in accordance with an embodiment of the present invention. CompressibleSet structure 10 may allow data in a set container using a tree-based data structure to be compressed in order to realize memory savings associated with eliminating the tree-based data structure and the overhead memory allocated for each entry in the tree based data structure. Memory may be any form of volatile or non-volatile memory including, without limitation, magnetic media, optical media, random access memory (RAM), read-only memory (ROM), removable media, or any other suitable local or remote memory component. Memory may store any suitable data or information, including software and encoded logic.

The teachings of embodiments of the present invention may be used for data structures in the set class and the map class of the C++ standard template library (STL). This disclosure and the examples used herein will focus on the set class data structure. However, the algorithms and other teachings of the invention are equally applicable to the map class.

Particular embodiments of the present invention may utilize, but not be limited to, the Microsoft Windows operating system and the C++ programming language. The teachings of embodiments of the present invention can be used across a variety of operating systems and could be adapted using a variety of programming languages. Other programming languages may use data structures similar to the set and map data structure offered by the STL.

Particular embodiments of the present invention may offer improved classes over the conventional STL map and STL set class. FIG. 2 illustrates CompressibleSet structure 10 represented by a unified modeling language (UML) diagram. CompressibleSet structure 10 includes CompressibleSet class 11. Although not specifically illustrated, teachings of the present invention may be employed similar to that described with reference to CompressibleSet in a Compressible Map class.

CompressibleSet class 11 may include 2 containers. For example, CompressibleSet class 11 may include set container 12 and vector container 14. There may be one instance of vector container 14 and one instance of set container 12 included in CompressibleSet class 11. CompressibleSet class 11 may use the label m_xSet when it calls set container 12 and may use the label m_xVector when it calls vector container 14. CompressibleSet class 11 may store keys 22, and an analogous compressible map class may store key/mapped-value pairs.

Set container 12 may include a tree structure of data. Tree structure 16 may be formed of nodes 18 and pointers 20. Nodes 18 and pointers 20 may allow navigation of the tree. Nodes 18 may contain keys 22. There may be one key in each node. In the illustrated embodiment of the present invention, keys 22 are abbreviations of states of the United States of America.

In order to store the state abbreviations shown in FIG. 2 in the tree structure 16, significant memory may be required. For example, memory may be required to track each block of allocated memory. Memory may also be required to link each node 18 to the other nodes. Memory may also be used for storing the actual data. That is, memory may be required to store the keys 22 themselves. Utilizing teachings of the present invention, memory associated with keeping track of each block of allocated memory and the memory required to link each tree node 18 to the other nodes may be reduced.

CompressibleSet class 11 may achieve memory savings by managing keys in both compressed and uncompressed forms. The uncompressed form may be an instance of std::set and the compressed form may be an instance of std::vector (an array). The uncompressed form set container 12 may require a block of memory for each key. In the compressed form, vector container 14 may have a single block of memory allocated to hold all of the keys in vector container 14. As a result, vector container 14 may incur less overhead memory allocation than memory allocated for each key in set container 12.

CompressibleSet class 11 may be populated with abbreviations of the fifty states by running a loop and instructing CompressibleSet 11 to add each of the state abbreviations. The state abbreviations may be original data and be populated in set container 12 in the tree structure 16 as shown in FIG. 2. Data in this format may allow a program or programmer to determine quickly whether certain data is included in the set. In addition, additional entries may be added and unwanted entries may be removed quickly from set container 12.

Population may be performed in this manner because CompressibleSet class 11 implements the same interface as std::set and is, in most cases, interchangeable with std::set. For example, using C++ code programming language, substituting CompressibleSet 11 for std::set in order to realize memory reduction in accordance with embodiments of the present invention may involve the replacement of the data type name in the program. Set container 12 and vector container 14 may be used internally and may not be exposed to the user of CompressibleSet 11.

FIG. 2 illustrates an instance where compressible set 11 may be populated with a complete set of data including all fifty state abbreviations. When an instance of CompressibleSet is populated, the insert operations are executed against set container 12. When the population process is complete, set container 12 may hold all of the stored keys and vector container 14 may be empty as illustrated in FIG. 2. After population, memory savings can be realized in accordance with teachings of embodiments of the present invention.

In order to realize memory savings in accordance with teachings of embodiments of the present invention, a compress operation may be called that moves the data from set container 12 to vector container 14. Moving data from set container 12 to vector container 14 may be initiated by calling an "in-order traversal" of the data in set container 12 that is in tree structure 16. The "in-order traversal" may be the natural behavior of an STL set that CompressibleSet 11 utilizes internally. In connection with the "in order traversal," a copy operation may be performed. Thus, an "in order traversal" may cause a first key to be read. This first key may be copied to vector container 14. Then, a second key may be similarly read and copied. This read and copy operation may be repeated for each key in set container 12.

This "in order traversal" may allow data to be moved from set container 12 to set container 14 efficiently because iterations of std::set naturally return the keys in set container 12 in sorted order, and std::set always tracks the number of keys it is holding at any given time. An "in-order traversal" may also involve visiting each node 18 of tree structure 16 in alphabetical, numerical, or other sorted order.

Before the data is moved to vector container 14, memory may be allocated for vector container 14 to hold the number of keys contained in set container 12. Once the memory is appropriately allocated, set container 12 may be iterated and the resulting keys may be added to vector container 14 as illustrated in FIG. 3.

The compression operation may be called once set container 12 is fully populated. Moving data from set container 12 to vector container 14 before set container 12 is fully populated may result in a time cost associated with converting the data over to the vector format but only reducing the memory footprint for a very brief period of time. Thus, additional processor time may be spent to realize a small amount of memory savings. If the entire CompressibleSet 11 is discarded soon after being populated, memory savings may not be as efficiently realized.

By calling compress and copying data from set container 12 to vector container 14 memory savings may be optimized if the data moved into vector container 14 is going to be maintained as long as the program is running, particularly if the program is running for hours or days. However, if the data in vector container 14 will only be kept by the program for a matter of seconds, the memory savings may not be worth the cost of processor time to perform the compression.

Figure 3:
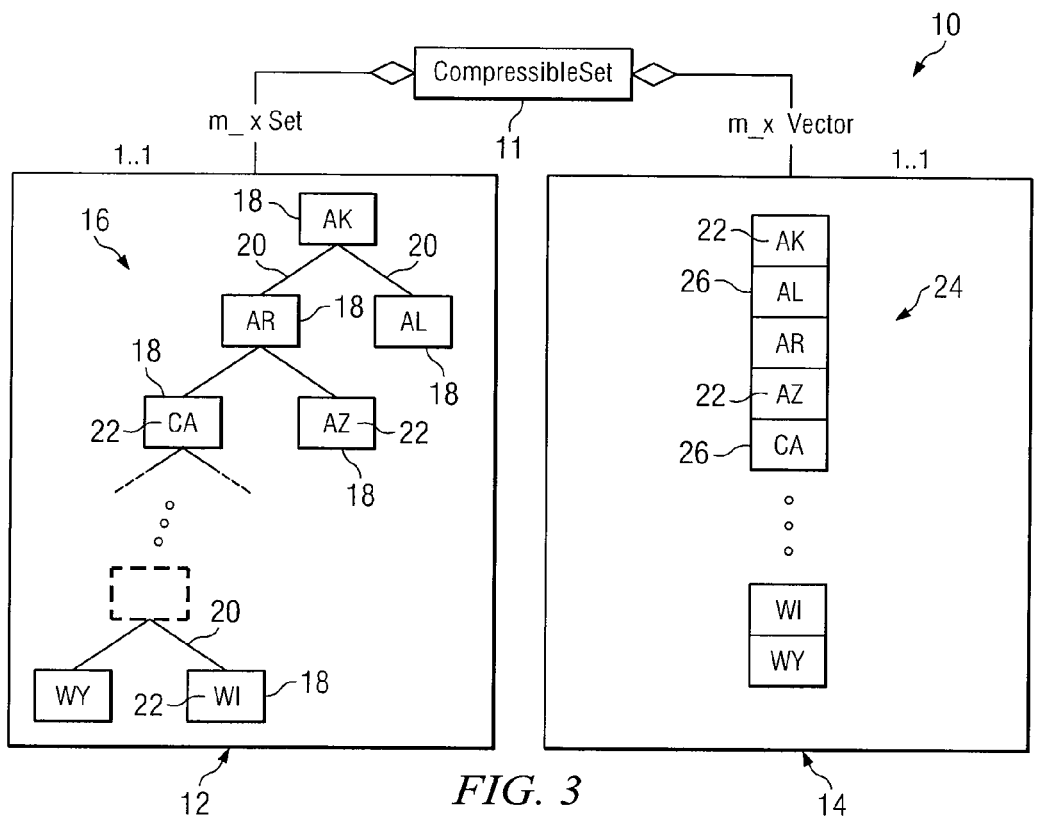
FIG. 3 illustrates a unified modeling language diagram of a compressible set structure during a transitional step that may occur during a compress operation in accordance with an embodiment of the present invention.

FIG. 3 illustrates a transitional state of CompressibleSet 11 during a compress operation. Set container 12 may be fully populated and vector container 14 may also be populated with data that has been copied from set container 12. Data in vector container 14 may be configured in vector 24. Vector 24 may be composed of vector elements 26 where each vector element contains an abbreviated state code in the embodiment illustrated in FIG. 3. Memory savings may not have been fully realized because set container 12 includes its original tree structure of data, and in addition, vector container 14 contains its array structure of the same data.

Figure 4:
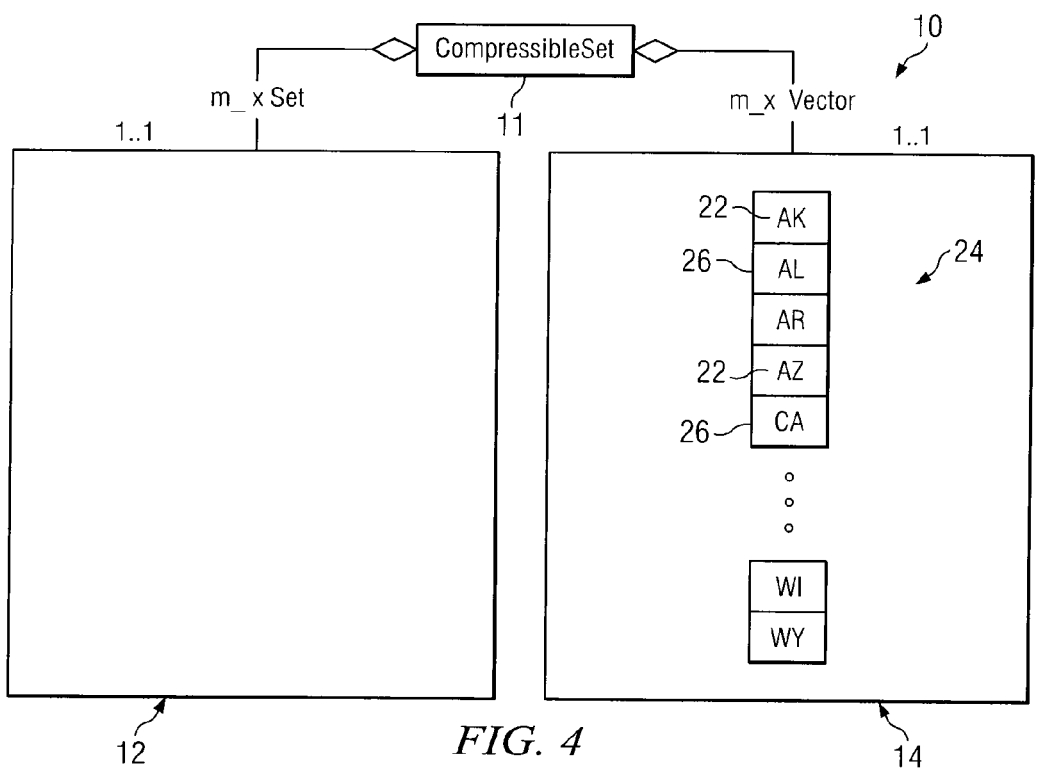
FIG. 4 illustrates a unified modeling language diagram of a compressible set structure with data in a vector container in accordance with an embodiment of the present invention.

In contrast, FIG. 4 illustrates CompressibleSet structure 10 with memory savings realized in accordance with an embodiment of the present invention. FIG. 4 illustrates CompressibleSet structure 10 after the keys have been moved into an array form in vector container 14 which may require a single block of memory allocated for the data in vector 24. Memory savings may be realized by removing the tree structure of data in set container 12. Thus, the data that was originally populated in set container 12 can be contained in vector container 14, but the memory overhead associated with the tree data structure including each node and each pointer may be eliminated.

Data in vector 24 in vector container 14 may be in alphabetical or other order. A quick look-up can be performed on the elements of vector container 14 using a binary search algorithm. Using the binary search algorithm to search for data in vector container 14 may be comparable in speed to locating the particular key in set container 12.

Figure 5:
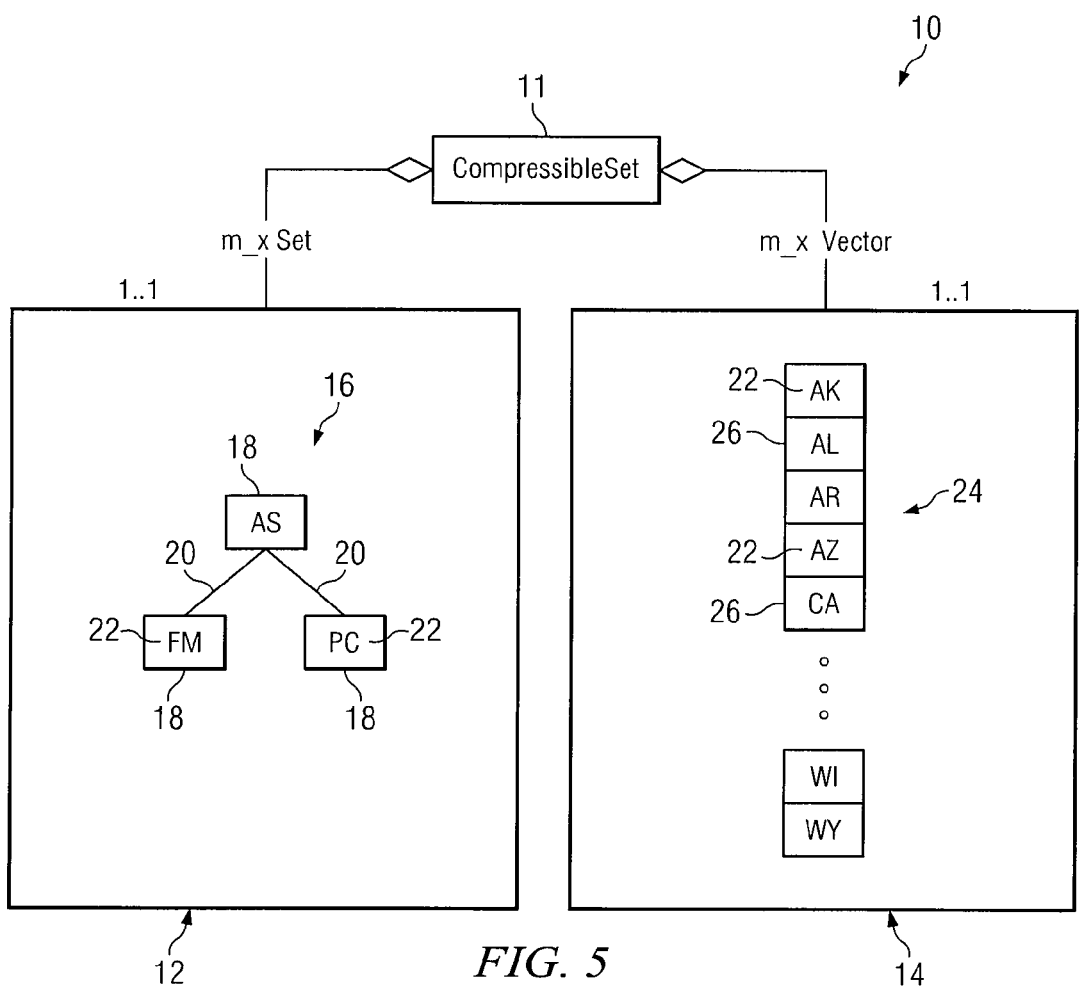
FIG. 5 illustrates a unified modeling language diagram of a compressible set structure with new data in a set container and original data in a vector container in accordance with an embodiment of the present invention.

Particular embodiments of the present invention may have additional data entered into set container 12 in a tree based data structure after compress has been called. FIG. 5 illustrates a CompressibleSet structure 10 including data in vector container 14 that has been compressed and occupies a single block of memory. Additional data is entered into set container 12 in the tree structure format.

In the example illustrated, the programmer may determine that it is desirable to include the abbreviation codes for the territories and possessions of the United States in addition to the abbreviated state codes. After fully populating the possession/territory abbreviation codes in set container 12, the programmer may choose to call the compress function and move the additional data set into vector container 14 in accordance with particular embodiments of the present invention. This may be accomplished by allocating memory for a new larger vector that would include all of the keys of the state codes that are presently in vector container 14 as well as all the keys that are the possession/territory codes that are in set container 12. Once this allocation is performed, the data from the original data set contained in vector container 14 and the data from the additional data set contained in set container 12 may be copied to the new larger vector and the old vector may be deleted. To realize additional memory savings, the tree based data structure of set container 12 may be deleted leaving only the array data structure in vector container 14 which includes the possession/territory and state abbreviation codes.

Figure 6A:
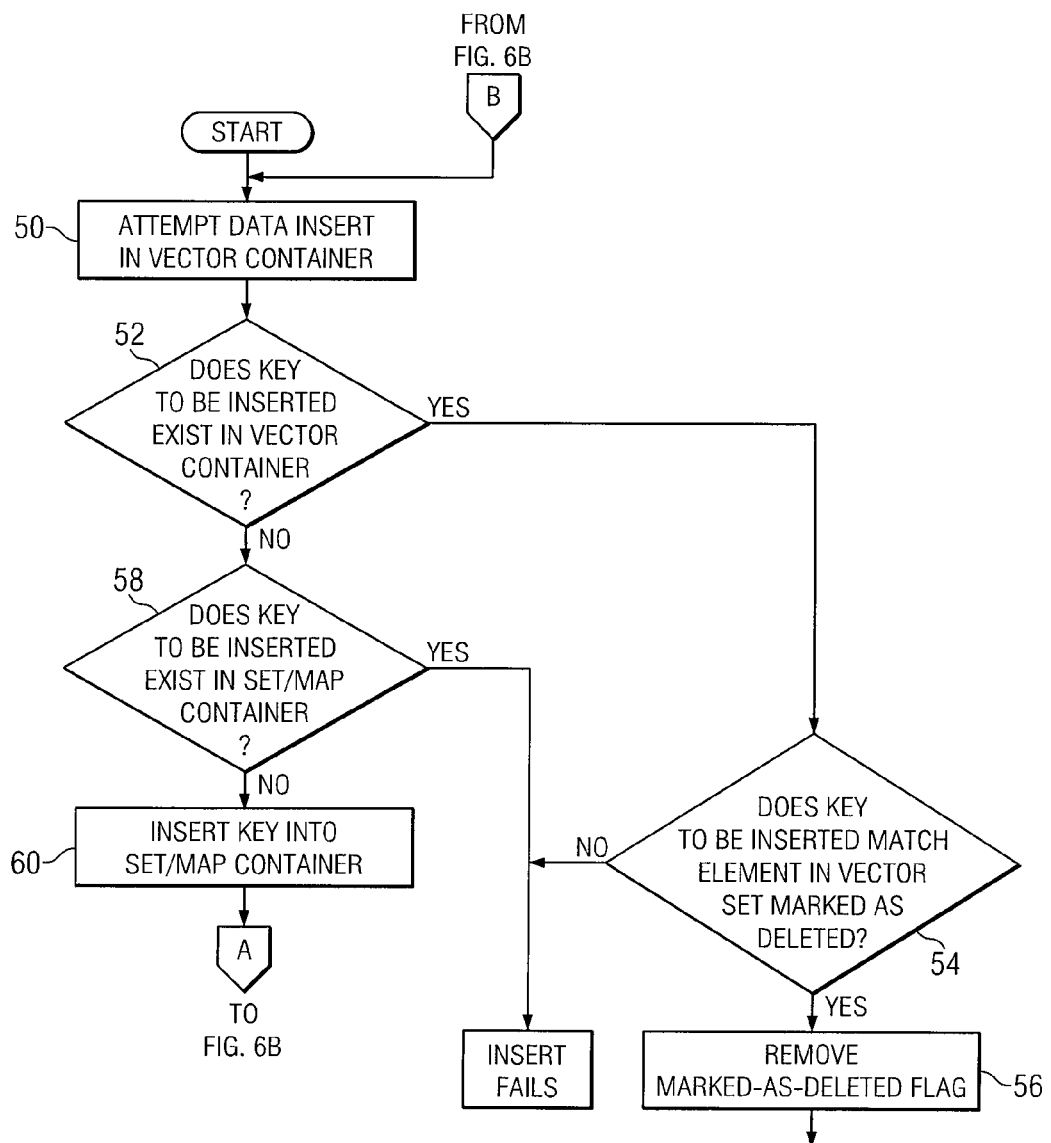
FIGS. 6A and 6B illustrate a flow diagram of a method to reduce memory usage in accordance with an embodiment of the present invention.
Figure 6B:
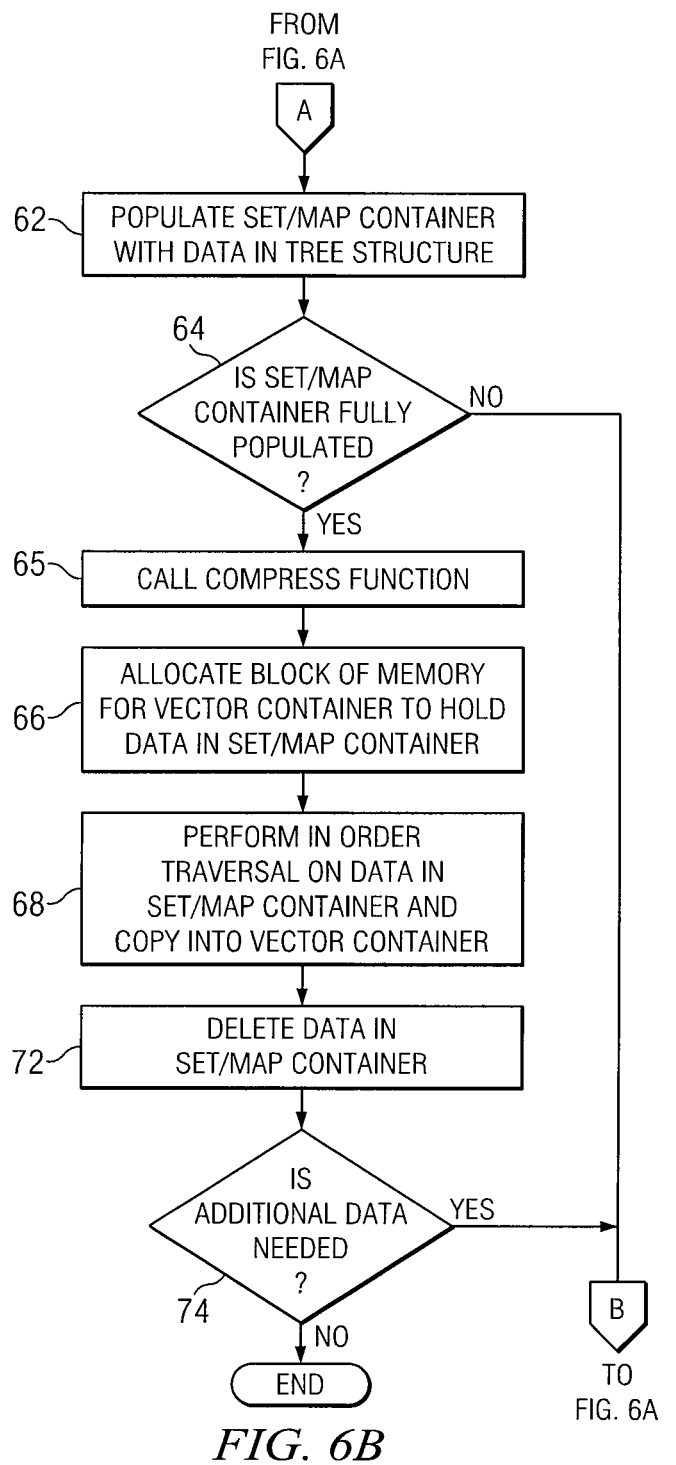

FIGS. 6A and 6B illustrate a flow diagram of memory savings achieved in accordance with a particular embodiment of the present invention. The method begins at step 50 where an attempt to add data to CompressibleSet 11 is made by first attempting to add the data in vector container 14. At step 52, a determination is made as to whether the data to be inserted exists as a key in vector container 14. If the key to be inserted matches an element in vector container 14, it is determined whether that element is marked as deleted at step 54. Marking an element as deleted that is included in vector container 14 will be further discussed with reference to FIG. 8. If the element is marked as deleted, then the marked as deleted flag on the element is removed at step 56. If it is not marked as deleted, then the insert operation fails because the matching key has been determined to be in vector container 14 but not marked as deleted.

Returning to step 52, if the key to be inserted does not exist in vector container 14, then at step 58, it is determined whether the key to be inserted exists in set/map container 12. If the key to be inserted does exist in set/map container 12, then the insert fails. If the key to be inserted does not exist in set/map container 12, then the key is inserted into set/map container 12 at step 60.

At step 62 the set/map container is populated with the keys that are inserted. The population is done in accordance with a tree based data structure as illustrated in FIG. 2. At step 64 it is determined whether the set/map container is fully populated. This determination may be made by the programmer or the program using CompressibleSet 11. Many factors may go into this determination. For example, it may be determined whether the set is populated sufficiently such that the memory savings of compressing the data in accordance with an embodiment of the present invention exceeds the processor cost of performing the compress operation. In the example illustrated in FIGS. 2-5, the programmer may determine that the set is fully populated once set container 12 includes all of the abbreviations for the 50 states. The programmer may also determine that memory savings may be beneficial even if the set is not fully populated and more data might be added after compression. If it is determined that the data should not be compressed, then the set container 12 continues to be populated in accordance with the steps 50-62 already described.

If the programmer or the program calling CompressibleSet 11 determines that the set/map container is fully populated and memory savings would be beneficial, then at step 65 the compress function may be called. Next, at step 66, the compress function may cause a block of memory to be allocated that is sufficient to allow vector container 14 to hold all the data in set/map container 12.

After the block of memory is allocated for the vector container to hold all of the keys that are in set/map container 12, "in-order traversal" and copy operations may be performed on the data in set/map container 12 at step 68. The "in order traversal" and the copying operations may be performed as part of the same step. The keys may be traversed to read the data, and as each key is read, it may be copied to vector container 14. After step 68, there may be duplicate data in set/map container 12 and vector container 14. The data in set/map container 12 may be in a set in a tree based structure, and the data in vector container 14 may be in an array structure as illustrated in FIG. 3.

At step 72, memory savings may be realized by deleting the data in set/map container 12, including the keys, the nodes, and the pointers. Deleting this data may free the overhead memory associated with the tree data structure. Although the data in set container 12 is deleted, the same data remains in vector container 14 where a single block of memory is allocated for the entire array of data.

After compress has been called and memory savings have been realized, CompressibleSet 11 may still have data added to it. Thus, at step 74, the programmer makes a determination whether additional data is needed. If additional data is not needed then the process ends. If additional data is needed, then the process returns to the start and proceeds in accordance with the method herein described with regard to steps 50 through 72.

Figure 7:
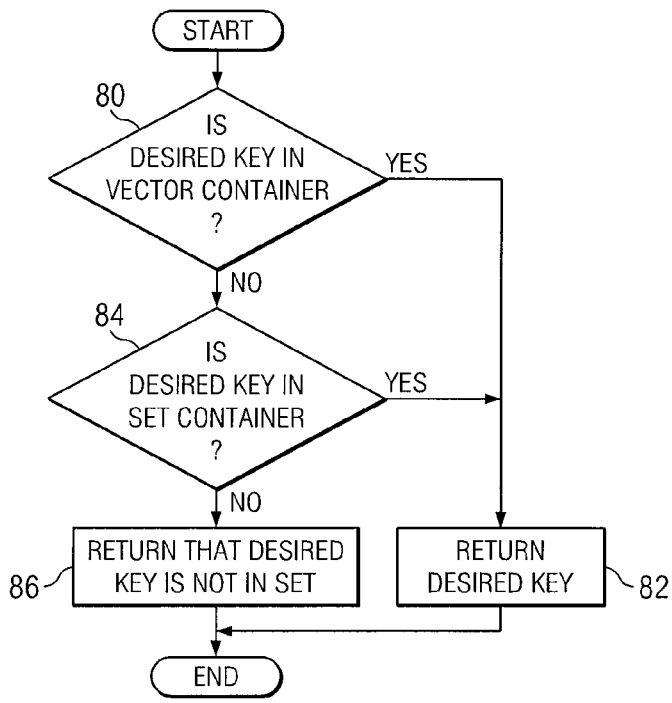
FIG. 7 illustrates a flow diagram of a find operation performed in accordance with a particular embodiment of the present invention.

FIG. 7 illustrates a flow diagram that may be followed when a find operation is performed on the data in CompressibleSet 11. The find operation may be performed internal to CompressibleSet 11 and the actual steps of the find operation may not be apparent to the programmer or program calling CompressibleSet 11. As far as the program or programmer is concerned, the find operation may execute just as it would if the find operation were being performed on data that is only contained in a set or map container.

The method begins at step 80 where it is determined whether the desired key, that is the key being searched for with the find operation, is found in vector container 14. If the desired key is found in vector container 14, then the desired key is returned at step 82. If the desired key is not in vector container 14, then it is determined whether the desired key is in set container 12 at step 84. If it is determined that the desired key is in the set container 12, then the desired key is returned. If it is determined that the desired key is not in the set container, then it is returned that the desired key is not in the set and cannot be found using the find operation at step 86.

Figure 8:
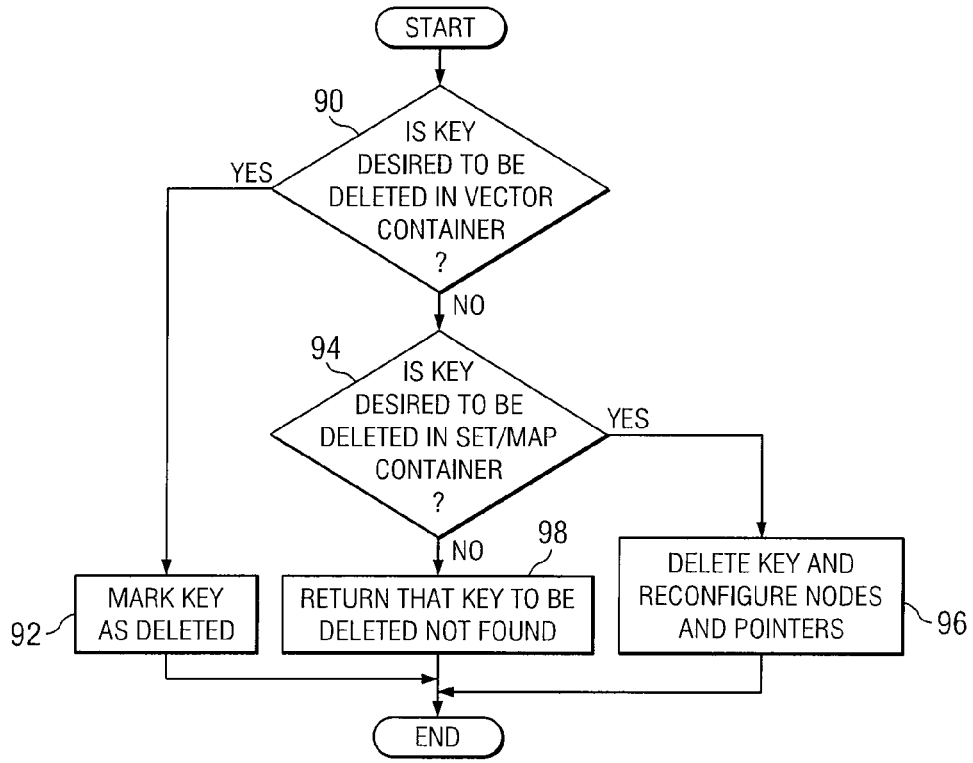
FIG. 8 illustrates a delete operation performed in accordance with a particular embodiment of the present invention.

FIG. 8 illustrates a flow diagram of a delete operation performed on the data in CompressibleSet class 11. The method begins at step 90 where it is determined whether the key or element desired to be deleted is contained in vector container 14. If the desired element to be deleted is contained in vector container 14, then that element is marked as deleted at step 92.

Marking the element as deleted may be more efficient than deleting the element from vector container 14. If the element were to be deleted, as opposed to marked as deleted, then the entry would be removed and the elements that are below it in the array would be shifted up. Removing the desired element and shifting up of the other elements may cause the delete operation to execute slower than if the element was merely marked as deleted. Significant performance advantages may be realized by marking the element as deleted, as opposed to deleting it from vector container 14. Moreover, if it is later determined that an element that has been marked as deleted should be re-added, then the marked as deleted indicator may simply be removed and the element will be recognized as being in vector container 14.

If the desired key to be deleted is not found in vector container 90, then it is determined whether the desired key to be deleted is included in set/map container 12 at step 94. If it is determined that the desired key to be deleted is contained in the set/map container 12, then the key is deleted from the set/map container 12 and the nodes and pointers are reconfigured. This deletion and reconfiguring of nodes and pointers may be performed in the conventional way deletion is done in a set container containing a tree-like structure of data. If it is determined that the key to be deleted is not included in set/map container 94, then it is returned that the key requested to be deleted was not found at step 98 and the method ends.

Figure 9:
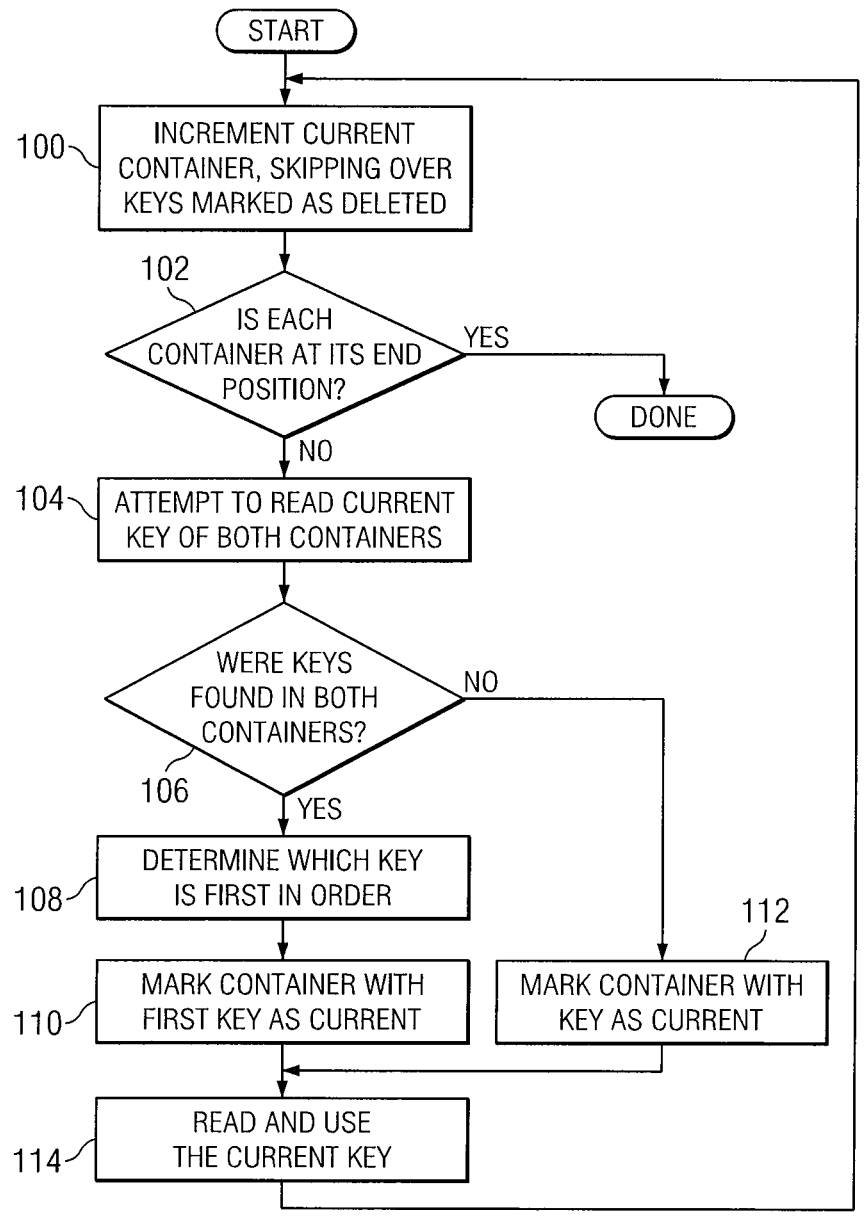
FIG. 9 illustrates a flow diagram of a method to sequentially access and read data in accordance with a particular embodiment of the present invention.
Figure 10:
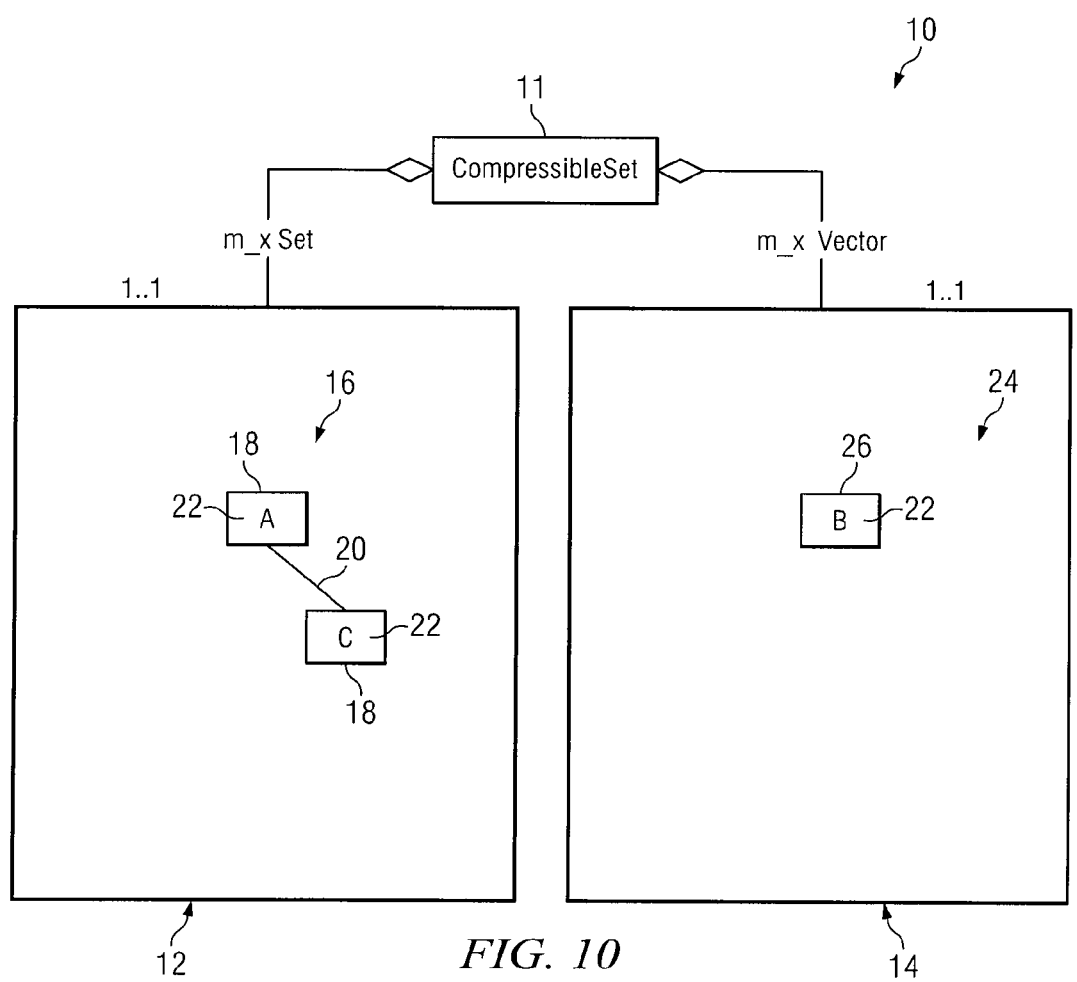
FIG. 10 illustrates a unified modeling language diagram of a compressible set structure with new data in a set container and original data in a vector container in accordance with an embodiment of the present invention.

FIG. 9 illustrates a flow diagram of sequentially accessing and reading data contained in CompressibleSet class 11. FIG. 10 is a unified modeling language diagram of CompressibleSet structure 10 that has been compressed and has had additional data added to set container 12. Similar to as has been previously described, the method may be equally applicable to a map container. However, for simplicity, the example method will be described only with respect to a set container. FIG. 10 is analogous to FIG. 5, but the example data illustrated in FIG. 10 includes the letters "A," "B," and "C" to better illustrate the sequential access reading method.

Sequential access reading of the data contained in CompressibleSet class 11 may occur when a calling program or programmer wishes to receive an ordered list of every key 22 contained in CompressibleSet class 11. Key 22 may be part of the original data that was compressed and now is in vector container 14, or key 22 may be part of the additional data that is contained in set container 12. CompressibleSet class 11 may perform the following method as an internal operation that may be transparent to the calling program or programmer. The data contained in set container 12 and vector container 14 may be accessed and read by creating an iterator that starts at the beginning (or end) and iterates step by step through all data in set container 12 and vector container 14.

Both set/map container 12 and vector container 14 are positioned before their first keys. At step 100, the positions of both containers are incremented. Both containers may be incremented because at the beginning of the method both containers are considered current. Incrementing may be accomplished by incrementing iterators associated with each container. In the example embodiment, the position of container 12 is on key "A" and the position of container 14 is on key "B". If either key "A" or key "B" was marked-as-deleted, the increment operation may skip the key so marked.

At step 102, the positions of both containers are examined to determine if each container is at its end position. Step 102 may be performed by examining the position of set/map container 12, and then examining the position of vector container 14. In alternate embodiments, vector container 14 may be examined before set/map container 12. If both positions are at the end of their respective containers, the method is complete and returns to the caller. In the illustrated example, neither container 12 nor container 14 is at its end position, causing the method to proceed to step 104.

At step 104 the method attempts to read the current keys of both containers. If a container's position is at the end, its key cannot be read. Step 104 may be performed by reading the key in the set/map container 12 first or by reading the key contained in the vector container 14 first. Referring to FIG. 10, key 22, which in this example is the letter "A", is read from set/map container 12, and key 22, which is represented by the letter "B" is read from vector container 14. The method then proceeds to step 106.

At step 106 the method determines if it successfully read a key from each of the two containers. In this example, the key values "A" and "B" were successfully read. The method then proceeds to step 108 where it is determined which of the keys that were read in step 104 is first in order. In the illustrated example, the order is alphabetical, and the key that is first in order is "A" from set/map container 12. The order of the keys may be numerical, alphabetical, or other type of suitable order. Alphabetical order is used as an example, but embodiments of the present invention are not limited to alphabetical order. The method then proceeds to step 110.

The container holding the key that is first in order is marked as being current at step 110. An iterator associated with this container may also be marked current. In the illustrated example, the key "A" is first in order and set/map container 12 is marked as being current. At step 114, the method returns control to the calling program. The calling program then reads the current key from CompressibleSet class 11 and uses the key for its own purposes. The calling program then makes another call to CompressibleSet class 11 to increment its position, which starts at step 100.

At step 100, the position of the current container is incremented. In the illustrated example, set/map container 12 is current and its position is incremented to key "C". At step 102, the positions of both containers are examined to determine if both are at their end positions. Step 102 may be performed by examining the position of the set/map container 12, and then examining the position of the vector container 14. If both positions are at the end of their respective containers, the method is complete and returns to the caller. In the illustrated example, neither container 12 nor container 14 is at its end position, causing the method to proceed to step 104.

At step 104 the method attempts to read the current keys of both containers. If a container's position is at the end, its key cannot be read. Step 104 may be performed by reading the key in set/map container 12 first or by reading the key contained in the vector container 14 first. Referring to FIG. 10, key 22, which in this example is the letter "C", is read from set/map container 12, and key 22, which is represented by the letter "B" is read from vector container 14. The method then proceeds to step 106.

At step 106 the method determines if it successfully read a key from each of the two containers. In this example, the key values "C" and "B" were successfully read. The method then proceeds to determine which of the keys that were read in step 104 is first in order, at step 108. In the illustrated example, the keys "C" and "B" are compared and "B" is determined to be first in order. The method then proceeds to step 110.

At step 110, the container holding the key that is first in order is marked as being current. In the illustrated example, the key "B" is first in order and vector container 14 is marked as being current. The method then proceeds to step 114 where control is returned to the calling program. The calling program then reads the current key from CompressibleSet class 11 and uses the key for its own purposes. The calling program then makes another call to the CompressibleSet to increment its position, which starts at step 100.

At step 100, the position of the current container is incremented. In the illustrated example, vector container 14 is current and its position is incremented to the end position. The method then proceeds to step 102 where the positions of both containers are examined to determine if both are at their end positions. In the illustrated example, set/map container 12 is not at its end position and vector container 14 is at its end position. This causes the method to proceed to step 104.

At step 104 the method attempts to read the current keys of both containers. If a container's position is at the end, its key cannot be read. In the illustrated example, vector container 14 is at its end position, so no key can be read. Set/map container 12 is not at its end position and key "C" is read. The method then proceeds to step 106. The method determines if it successfully read a key from each of the two containers, at step 106. In this example, only key "C" was successfully read, so the method then proceeds to step 112.

At step 112 the container that provided the key in step 106 is marked as current. In the illustrated example, set/map container 12 provided key "C". Container 12 is marked as current and the method proceeds to step 114 where control is returned to the calling program. The calling program then reads the current key from CompressibleSet class 11 and uses the key for its own purposes. The calling program then makes another call to CompressibleSet class 11 to increment its position, which starts at step 100.

At step 100, the position of the current container is incremented. In the illustrated example, set/map container 12 is current and its position is incremented to the end position. The method then proceeds to step 102.

At step 102, the positions of both containers are examined to determine if both are at their end positions. In the illustrated example, both set/map container 12 and vector container 14 are at their end positions. The method then returns to the calling program. CompressibleSet class 11 is now positioned at its end position. By reading the position of CompressibleSet class 11, the calling program knows that no more keys are available and makes no further calls to step 100. The result of the example method may be alphabetically ordered key values, "A," "B," "C" that are received by the calling program.

Some of the steps illustrated in FIGS. 6A through 9 may be combined, modified, or deleted where appropriate, and additional steps may also be added to the flowcharts. Additionally, steps may be performed in any suitable order without departing from the scope of the invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

Implementation

The following provides an example implementation of an embodiment of the present invention using the C++ computer language.

The STL classes std::set and std::map are templated classes, with the template parameters specifying the data types to be stored within these container classes. The class names "std::set" and "std::map" may include the template parameters as shown below:

std::set<key_type>
    std::map<key_type, mapped_type>

When declaring instances of these classes in C++ source code, actual data types may be substituted for key_type and mapped_type. For example:

std::set<integer>
std::map<integer, stl::string>

The first is a declaration of an std::set that stores integer keys. The second declares an std::map that stores integer/string pairs and uses the integer as the key.

To implement the interfaces of std::set and std::map, CompressibleSet and CompressibleMap may also be templated classes and may accept the same template parameters as the STL classes that they mimic. The compressible containers may have the following class names:

CompressibleSet<key_type>
CompressibleMap<key_type, mapped_type>

CompressibleSet may maintain internal containers to hold the data it stores. The class member m_xSet may be an STL set parameterized with key_type. Its declaration may be the following:

```
/// A set for storing the key_type data.
typedef std::set< key_type >    Set_t;
```

The other internal container, m_xVector, may be an STL vector, but it may not be parameterized with key_type. Instead, it may be parameterized with a structure that contains an instance of key_type and a Boolean flag to keep track of the deletion state. The code below shows the declaration of this structure and of m_xVector.

```
struct Entry
{
    /// Copy constructor.
            _stdcall    Entry( const Entry & rxOther );
    /// Default constructor.
            _stdcall    Entry( );
    /// Constructor parameterized with key_type.
            _stdcall    Entry( const key_type & rxElement );
    /// Assignment operator.
    Entry & _stdcall    operator = ( const Entry & rxOther );
    /// Comparison operator for ordering.
    bool    _stdcall    operator < ( const Entry & rxOther ) const;
    /// The key_type being stored.
    key_type    m_xKey;
    /// Entry deletion flag.
    bool        m_bDeleted;
};
/// A vector for storing Entry instances.
typedef std::vector<Entry>      Vector_t;
```

It should be noted that the declaration of Entry is nested within CompressibleSet. The existence of Entry is hidden and users of CompressibleSet may not have access to it. The first two constructors shown may be required to allow instances of Entry to be stored in an std::vector. The copy constructor copies the two data members from rxOther. The default constructor just initializes m_bDeleted to false. The third constructor may be needed when adding elements to m_xVector. This constructor copies the value of m_xKey from rxElement and sets m_bDeleted to false. The assignment operator works the same as the copy constructor.

The comparison operator may be required for sorting operations. This method returns true if the value of self is less than the value of rxOther. The implementation used invokes the comparison operator of m_xKey and returns that comparison result. The effect of this is to ignore m_bDeleted and have sorting based solely on key_type.

CompressibleMap also uses an Entry structure similar to that of CompressibleSet with the exception that it stores a key_type/mapped_type pair instead of key_type alone. To do this, CompressibleMap declares the datatype value_type as shown here:

```
/// The values stored by this class' internal map and vector.
typedef std::pair<const key_type, mapped_type> value_type;
```

In the declaration of CompressibleMap::Entry, the member m_xPair is used instead of the member m_xKey that appears in the CompressibleSet::Entry structure. This member declaration is shown here:

```
/// The key_type/mapped_type pair.
value_type                      m_xPair;
```

CompressibleSet may declare the following typedefs for two internal containers:

```
/// A set for storing the key_type data.
typedef std::set< key_type >    Set_t;
/// A vector for storing Entry instances.
typedef std::vector<Entry>      Vector_t;
```

The following enums may also be declared:

```
/// Positional states for iterator and const_iterator.
enum IteratorState_e { kUninitialized, kOnValue, kAtEnd };
/// Identifiers for the internal containers.
enum ActiveIterator_e { kSet, kVector, kNone };
```

These enums may be used by the iterator classes discussed below.

CompressibleSet may have the following three data members:

```
/// The internal set holding "uncompressed" elements.
Set_t                           m_xSet;
/// The internal vector holding the "compressed" elements in sorted order.
Vector_t                        m_xVector;
/// The number of vector elements currently marked as deleted.
size_t                          m_nDeletedEntries;
```

The use of these data members is further explained below with the discussion of the specific algorithms used by CompressibleSet.

Both std::set and std::map may provide iterators as a means of accessing the stored elements and to indicate a position (based on the sort order) within the stored elements. CompressibleSet and CompressibleMap may provide iterators that implement the same interface as those in std::set and std::map. Iterators for CompressibleSet will be discussed below, and the significant differences between CompressibleSet and CompressibleMap will be noted. The CompressibleMap iterators will be discussed only where notable differences exist.

CompressibleSet implements as nested classes two iterators named "iterator" and "const_iterator". These class names match those in std::set—this match may be required in order to implement the std::set interface. The interfaces of iterator and const_iterator may be similar with the exception that iterator allows modification of its associated container while const_iterator does not. Because of this similarity, the following discussion will focus on iterator and mention const_iterator only where there are significant differences.

The iterator class is implemented as a nested class within CompressibleSet and its visibility is public. It is also declared to be a friend of CompressibleSet to provide full access to the internal containers. The iterator class may have the data members listed below, all of which are declared as private.

```
/// The container being iterated.
CFXCompressibleSetT<key_type> * m_pxCompSet;
/// Iterator for the internal set.
typename Set_t::iterator         m_xSetIter;
/// Iterator for the internal vector.
typename Vector_t::iterator      m_xVectorIter;
/// Positional state.
IteratorState_e                  m_eState;
/// Indicates which internal iterator is active.
ActiveIterator_e                 m_eActiveIterator;
```

The member m_pxCompSet is a pointer to a CompressibleSet instance and is used by iterator to access the internal containers m_xSet and m_xVector. The members m_xSetIter and m_xVectorIter are STL iterators used to access the data within m_xSet and m_xVector. CompressibleSet::iterator manipulates these two internal iterators to emulate the behavior of std::set::iterator. The member m_eState is used by CompressibleSet::iterator to keep track of its state. A state of kUninitialized indicates that the iterator has been created, but not yet positioned. The state kOnValue indicates that the iterator has been positioned and currently references an element within the container. The state kAtEnd exists when the position has been moved beyond that last element in the container. The member m_eActiveIterator specifies which of the internal iterators is considered active and pointing to the current element within the CompressibleSet. The ability to switch between the two internal iterators may allow CompressibleSet to blend together its two internal containers and make them seem like one.

The following sections list the methods of CompressibleSet and CompressibleSet::iterator and discuss their implementations in detail.

Constructors

```
public:
   /// Default constructor.
   _stdcall  iterator( );
   /// Copy constructor.
   _stdcall  iterator( const iterator & rxIter );
private:
   /// Constructor parameterized with a CFXCompressibleSetT.
   _stdcall  iterator( CFXCompressibleSetT<key_type> & rxCompSet
);
```

The default constructor is declared as public and initializes the iterator's data members. m_eState is set to kUninitialized, m_eActiveIterator is set to kNone and m_pxCompSet is set to null. The copy constructor is also declared as public and initializes all data members by copying them from the source iterator rxiter. The third constructor has a signature that is not part of the public interface of std::set. It is used internally by CompressibleSet and is declared as private.

The data members are initialized as follows. m_eState is set to kUninitialized and m_eActiveIterator is set to kNone. m_pxCompSet is set to the address of the rxCompSet parameter. Finally, the internal iterators m_xSetIter and m_xVectorIter are both positioned to the "end" position. In other words, they are positioned beyond the last element of their associated containers.

CompressibleSet::iterator implements the following operators:

```
/// 'Value of' operator.
    typename CFXCompressibleSetT<key_type>::key_type &
        _stdcall  operator * ( );
/// Pointer dereference operator.
    typename CFXCompressibleSetT<key_type>::key_type *
        _stdcall  operator->( ) const;
/// Equality operator.
    bool _stdcall    operator ==( const iterator & rxOther )
const;
/// Inequality operator.
    bool _stdcall    operator !=( const iterator & rxOther )
const;
/// Prefix increment operator.
    iterator & _stdcall  operator++( );
/// Postfix increment operator.
    iterator _stdcall  operator++( int );
```

The "value of" operator returns a non-const reference to the current element. In the matching method of const_iterator, a const reference is returned. The implementation routes the method call to the same method of the active iterator. If no iterator is active, an exception is thrown. The "pointer dereference" operator is identical to "value of" with the exception that a pointer, not a reference, is returned. The equality operator is implemented as follows:

```
If the iterator state is not equal to the state of rxOther,
   return false.
If the iterator state is not equal to kOnValue, return true.
If the iterator's internal interators (m_xSetIter and
   m_xVectorIter) are equal to those of rxOther, return true.
Otherwise return false.
```

The inequality operator simply returns the negation of the equality operator.

The two increment operators use the Increment( ) method (discussed below) to move their position forward. The prefix version returns a reference to self after its position has been incremented. The postfix version returns a copy of self as it existed before being incremented.

```
Begin( )
    /// Positions both internal iterators to the first element.
    void _stdcall  Begin( );
    /// Increment the active internal iterator.
    void _stdcall  Increments( );
```

Begin( ) is a protected method and is implemented as follows:
  Set m_xSetIter to its beginning position.
  Set m_xVectorIter to its beginning position.
  Ensure that m_xVectorIter is not positioned on a deleted element. This is done with a while-loop that iterates as long as m_xVectorIter is not positioned at end and the current element referenced by m_xVectorIter is not marked as deleted. Each loop iteration increments the position of m_xVectorIter. At the end of this loop, m_xVectorIter will either be positioned on the first non-deleted element or positioned at end.
  Next, a test is performed to determine if both m_xSetIter and m_xVectorIter are both positioned at end. If so, m_eState is set to kAtEnd, m_eActiveIterator is set to kNone, and the method returns.
  If the method has not returned yet, at least one of the internal iterators is positioned on a value and m_eState is set to kOnValue. At this point, which internal iterator to set as active can be determined.

If m_xSetIter is positioned at end, m_eActiveIterator is set to kVector, and the method returns.

If m_xVectorIter is positioned at end, m_eActiveIterator is set to kSet, and the method returns.

At this point, both internal iterators are positioned on a value. m_eActiveIterator is set to the iterator positioned on the lower value and the method returns.

Increment( )

Increment( ) is a protected method and is implemented as follows:

If m_eActiveIterator is equal to kSet, the position of m_xSetIter is incremented. Otherwise the position of m_xVector iterator is incremented to the next non-deleted element. This is done with the same while-loop as was described in Begin( ).

Next, a test is performed to determine if both m_xSetIter and m_xVectorIter are both positioned at end. If so, m_eState is set to kAtEnd, m_eActiveIterator is set to kNone, and the method returns.

If the method has not returned yet, at least one of the internal iterators is positioned on a value and m_eState is set to kOnValue. At this point, which internal iterator to set as active can be determined.

If m_xSetIter is positioned at end, m_eActiveIterator is set to kVector, and the method returns.

If m_xVectorIter is positioned at end, m_eActiveIterator is set to kSet, and the method returns.

At this point, both internal iterators are positioned on a value. m_eActiveIterator is set to the iterator positioned on the lower value and the method returns.

Construction and Destruction

CompressibleSet implements a default constructor and a non-virtual destructor.

```
/// Default constructor.
_stdcall   CFXCompressibleSetT(void);
/// Destructor.
_stdcall   ~CFXCompressibleSetT(void);
```

The default constructor initializes m_nDeletedEntries to zero, but otherwise is empty. The destructor is empty.

```
begin( )
    /// Returns a const_iterator addressing the first element in the set.
    typename CFXCompressibleSetT::const_iterator
              _stdcall   begin( ) const;
    /// Returns an iterator addressing the first element in the set.
    typename CFXCompressibleSetT::iterator
              _stdcall   begin( );
```

The begin( ) method returns an iterator positioned on the first element. Two versions of this method are provided: one returns a const_iterator and the other a non-const iterator. Both implementations instantiate an iterator of the appropriate type on the stack, invoke the iterator's begin( ) method and returns a copy of the iterator.

```
clear( )
    /// Removes all elements.
    void            _stdcall   clear( );
```

The clear( ) method removes all elements from the CompressibleSet. The implementation simply invokes clear ( ) on both internal containers.

```
empty( )
    /// Returns true if the container is empty.
    bool            _stdcall   empty( ) const;
```

The empty ( ) returns true if the CompressibleSet is empty. The implementation is as follows:

```
If m_xSet is not empty, return false.
Substract m_nDeletedEntries from the size of m_xVector.
If the result is greater than zero, return false.
Otherwise return true.
end( )
    /// Returns a const_iterator that addresses the location succeeding
    /// the last element in a set.
    typename CFXCompressibleSetT::const_iterator
              _stdcall   end( ) const;
    /// Returns an iterator that addresses the location succeeding
    /// the last element in a set.
    typename CFXCompressibleSetT::iterator
              _stdcall   end( );
```

The end( ) method returns an iterator positioned past the last element within the CompressibleSet. The implementation instantiates an iterator of the appropriate type on the stack, sets the iterator's state to kAtEnd, and returns a copy of the iterator. As with begin( ), two versions of end( ) are provided, one returns a const_iterator and the other returns a non-const iterator.

```
equal_range( )
    /// Returns a pair of const iterators such that the first is the
    /// lower_bound of the key and the second is the upper_bound of
    the key.
    std::pair <typename CFXCompressibleSetT::const_iterator, typename
        CFXCompressibleSetT::const_iterator>
              _stdcall   equal_range( const key_type & rxKey ) const;
    /// Returns a pair of iterators such that the first is the lower_bound
    /// of the key and the second is the upper_bound of the key.
    std::pair <typename CFXCompressibleSetT::iterator, typename
        CFXCompressibleSetT::iterator>
              _stdcall   equal_range( const key_type & rxKey )
```

The equal_range( ) method provides the caller with a pair of iterators that bracket the entries that match the value of rxKey. The first iterator is positioned on the first element matching rxKey and the second is positioned just beyond the last matching element. The implementation does this by invoking lower_bound( ) and upper_bound( ), making an std::pair of the resulting iterators and returning that pair. Two versions of this method are provided, one returns const_iterators and the other non-const iterators.

```
erase( )
    /// Removes an element.
    size_t            _stdcall erase( const key_type & rxKey );
    /// Removes the element at the specified position.
    typename CFXCompressibleSetT::iterator _stdcall
    erase( typename CFXCompressibleSetT<key_type>::iterator rxIter );
```

The erase( ) method removes and element from the CompressibleSet. The first version removes the element that matches rxKey. The logic is shown here as pseudo code:

Try to find rxKey in m_xVector by calling std::lower_bound( ).

If a matching entry was found
{
    If the entry is not marked as deleted

```
        {
            Mark the entry as deleted.
            Increment m__nDeletedEntries.
            Return the value one.
        }
        else
        {
            Return zero.
        }
    }
    // The key wasn't found in the vector. Now try
    // removing it from the set.
    Invoke erase( ) on m__xSet using rxKey as the parameter.
    Return the result of erase( ).
```

The second version of erase( ) removes the element at the position specified by rxiter and returns an iterator positioned after the deleted element. The logic of the implementation is shown below as pseudo code:

```
If rxIter's active iterator equals kNone, invoke end( ) and
return its result.
Create a copy of rxIter called xResultingIter.
If rxIter's active iterator equals kVector
{
    Create an Entry reference called rxFoundEntry and
    initialize it to the current entry of
    rxIter.m__xVectorIter.
    If rxFoundEntry is not marked as deleted
    {
        Mark it as deleted.
        Increment m__nDeletedEntries.
    }
    Increment xResultingIter.
}
else
{
    Set xResultingIter.m__xSetIter equal to the result of
    m__xSet.erase( rxIter.m__xSetIter ).
}
return xResultingIter.
find( )
        /// Returns a const_iterator addressing the location of an
        /// element in a set that has a key equivalent to a
        /// specified key.
        typename CFXCompressibleSetT::const_iterator __stdcall
            find( const key__type & rxKey ) const;
        /// Returns an iterator addressing the location of an
        /// element in a set that has a key equivalent to a
        /// specified key.
        typename CFXCompressibleSetT::iterator __stdcall
            find( const key__type & rxKey );
```

The find( ) method returns an iterator positioned on the element matching rxKey, or positioned at end if no match was found. Const and non-const versions are provided.
The logic of the implementation of the find( ) method is shown below as pseudo code:

```
Construct on the stack an iterator of the appropriate type
    (const vs. non-const) called xIter and provide the
CompressibleSet instance as the constructor parameter.
If m__xVector is not empty
{
    Construct an Entry instance called xEntry using rxKey as
    the constructor parameter.
    Using std::lower_bounds( ), search for a match of xEntry in
    m__xVector.
    If found and the found entry is not marked as deleted
    {
        Set xIter.m__eState equal to kOnValue.
        Set xIter.m__eActiveIterator equal to kVector.
        Return a copy of xIter.
    }
}
Search for rxKey in m__xSet using the find( ) method.
If found
{
    Set xIter.m__eState equal to kOnValue.
    Set xIter.m__eActiveIterator equal to kSet.
    Return a copy of xIter.
}
Set xIter.m__eState equal to kAtEnd.
Set xIter.m__eActiveIterator to kNone.
Return a copy of xIter.
insert( )
        /// Inserts an element.
        std::pair<typename CFXCompressibleSetT<key__type>::iterator,
           bool>
            __stdcall insert( const key__type & rxElement );
        /// Inserts an element at a specified position.
        typename CFXCompressibleSetT<key__type>::iterator __stdcall
            insert( typename CFXCompressibleSetT<key__type>::iterator
                rxIter, const key__type & rxElement );
```

The first version of insert( ) inserts a key into the CompressibleSet. The return value is a pair object containing an iterator that addresses the position at which the insert occurred and a Boolean value which indicates if the insertion was successful. The logic for its implementation is shown below as pseudo code:

```
Construct an iterator called xIter and use the
    CompressibleSet instance as the constructor parameter.
If m__xVector is not empty
{
    Declare a boolean variable on the stack called bInsertOk
    and initialize its value to false.
    Construct an Entry on the stack called xEntry and use
    rxElement as the constructor parameter.
    Search for a match of xEntry within m__xVector with
    std::lower_bound( ).
    If a match was found
    {
        Set xIter.m__eState equal to kOnValue.
        Set xIter.m__eActiveIterator equal to kVector.
        If the found entry is marked as deleted
        {
            Set bInsertOk equal to true.
            Mark the found entry as not deleted.
            Decrement m__nDeletedEntries
        }
        Return a pair object containing xIter and bInsertOk.
    }
}
Insert rxElement into m__xSet and use its return value to
initialize a pair object called xPair.
Set xIter.m__xSetIter = the first part of xPair, which is an
iterator.
Set xIter.m__eState = kOnValue.
Set xIter.m__eActiveIterator = kSet.
Return a new pair object initialized with xIter and the
second part of xPair (the boolean value).
```

The second version of insert( ) has the same purpose as the first, but accepts an additional parameter that is used as a hint of where the insertion should occur. The logic is very similar to the logic shown above. The logic involving m__xVector is the same because std::lower_bound( ) does not accept a hint parameter. Below is the pseudo code for the logic that follows the m__xVector logic:

```
Invoke m__xSet.insert( ) with rxIter.m__xSetIter as the first
    parmeter and rxElement as the second. Assign the result of
    this method to xIter.m__xSetIter.
```

```
    Set xIter.m_eState equal to kOnValue.
    Set xIter.m_eActiveIterator equal to kSet.
    Return a copy of xIter.
lower_bound( )
    /// Returns a const_iterator to the first element in a set that
    with
    /// a key value that is equal to or greater than that of a
    specified key.
    typename CFXCompressibleSetT::const_iterator _stdcall
        lower_bound( const key_type & rxKey ) const;
    /// Returns an iterator to the first element in a set that with a
    key
    /// value that is equal to or greater than that of a specified
    key.
    typename CFXCompressibleSetT::iterator _stdcall
        lower_bound( const key_type & rxKey );
```

The lower_bound( ) method performs a search and returns an iterator positioned on an element that is equal to or greater than the key, or an iterator positioned at end. This latter case occurs when the specified key is greater than all keys in the container. Const and non-const versions are provided. The logic for lower_bound( ) is as follows:

```
Construct an iterator called xIter and use the
CompressibleSet instance as the constructor parameter.
Search for rxKey in m_xSet by invoking m_xSet.lower_bound( ).
Assign the result to xIter.m_xSetIter.
Construct an Entry object called xEntry and use rxKey as the
constructor parameter.
Search for a match of xEntry within m_xVector by invoking
m_xVector.lower_bound( ). Assign the result to
xIter.m_xVectorIter.
// Ensure that the vector iterator isn't positioned on a
deleted element.
Loop while xIter.m_xVectorIter is not positioned at end
{
    If the xIter's current element is marked as deleted
    {
        Increment xIter.m_xVectorIter.
        Jump back to the top of the loop.
    }
    Break out of the loop.
}
If both of xIter's internal iterators are positioned at end
{
    Set xIter.m_eState = kAtEnd.
    return a copy of xIter.
}
Set xIter.m_eState = kOnValue.
If both of xIter's internal iterators are positioned on a
value
{
    If the current element of xIter.m_xSetIter is less than
    that of xIter.m_xVectorIter
        Set xIter.m_eActiveIterator = kSet.
    else
        Set xIter.m_eActiveIterator = kVector.
    Return a copy of xIter.
}
If xIter.m_xVectorIter is positioned at end
    Set xIter.m_eActiveIterator = kSet.
else
    Set xIter.m_eActiveIterator = kVector.
Return a copy of xIter.
max_size( )
    /// Returns the theoretical maximum number of elements
    /// that can be stored in this type of container.
    size_t         _stdcall max_size( ) const;
```

The max_size( ) method returns the maximum number of elements that can be stored within a CompressibleSet assuming an unlimited amount of memory is available. CompressibleSet's implementation simply returns the result of m_xVector.max_size( ).

```
size( )
    /// Returns the number of elements stored.
    size_t         _stdcall size( ) const;
```

The size( ) method returns the number of elements actually stored within the CompressibleSet. The implementation calculates this value by adding m_xSet.size( ) and m_xVector.size( ) and subtracting m_nDeletedEntries.

```
upper_bound( )
    /// Returns a const_iterator to the first element in a set that with
    /// a key value that is greater than that of a specified key.
    typename CFXCompressibleSetT::const_iterator _stdcall
        upper_bound( const key_type & rxKey ) const;
    /// Returns an iterator to the first element in a set that with a
    /// key value that is greater than that of a specified key.
    typename CFXCompressibleSetT::iterator _stdcall
        upper_bound( const key_type & rxKey );
```

The upper_bound( ) method searches for a key and returns an iterator positioned on the first key that is greater than rxKey. If no such key is found, an iterator positioned at end is returned. Const and non-const versions are provided. The implementation of this method is similar to that of lower_bound( ) except that the searching of the internal containers is done with upper_bound( ) instead of lower_bound( ).

```
Compress( )
    /// Moves all elements from the internal set into the internal
    vector.
    /// Returns number of elements added to the vector.
    size_t         _stdcall    Compress( );
```

The Compress( ) reduces the memory overhead of the CompressibleSet by moving all elements from the internal set to the internal vector in sorted order. The logic is presented here as pseudo code.

```
Create a numeric variable called nSetSize and initialize it
to the return value of m_xSet.size( ).
If nSetSize is equal to zero, there is nothing available to
compress, so return zero.
If m_xVector.size( ) is greater than zero
{
    In m_xVector, reserve enough memory to store a number of
    elements equal to nSetSize.
    Iterate m_xSet and copy its values into m_xVector. Each
    m_xSet value must be wrapped in an Entry instance before
    inserting it into m_xVector.
    Remove all elements from m_xSet.
    Return nSetSize.
}
else
{
    Return the result of MergeContainers( ).
}
InternalSetSize( )
    /// Returns the number of entries in the internal set.
    size_t         _stdcall InternalSetSize( ) const;
```

Returns the number of elements stored in m_xSet. This can be useful when deciding if a call to Compress( ) is needed.

```
InternalVectorSize( )
    /// Returns the number of non-deleted entries in the internal vector.
    size_t         _stdcall   InternalVectorSize( ) const;
```

Returns the number of elements stored in m_xVector. This value is calculated as m_xVector.size ( ) minus m_nDeletedEntries.

```
DeletedEntryCount( )
    /// Returns the number of deleted entries in the internal vector.
    size_t          _stdcall   DeletedEntryCount( ) const;
```

Returns the number of elements in m_xVector that are marked as deleted (m_nDeletedEntries).

```
MergeContainers( )
    /// Moves the set elements into the vector when the vector is not
empty.
    size_t          _stdcall   MergeContainers( );
```

The method MergeContainers( ) creates a replacement of m_xVector that contains all elements within m_xSet and all non-deleted elements from the original m_xVector. The logic is presented below as pseudo code.

```
Create a numeric variable called nSetSize and initialize it
to m_xSet.size( ).
Create a numeric variable called xNewSize and initialize it
to nSetSize plus m_xVector.size( ) minus m_nDeletedEntries.
Create a vector on the stack called xNewVector and reserve
enough memory to hold nNewSize elements.
Create a Entry object on the stack using the default
constructor.
Create a const_iterator called xSetIter and initialize it to
m_xSet.begin( ).
Create a const_iterator called xVectorIter and initialize it
to m_xVector.begin( ).
Loop until both xSetIter and xVectorIter have reached their
end positions
{
  If xVectorIter is not at its end position
  {
    If xVectorIter's current element is marked as deleted,
    increment this iterator and jump back to the top of the
    loop.
    If xSetIter is at its end position
    {
      Copy the current element of xVectorIter to
      xNewVector.
      Jump to the top of the loop.
    }
    else
    {
      // Both iterators are positioned on a value. Add
      // the lesser value to xNewVector.
      If the current element of xSetIter is less than that
      of xVectorIter
      {
        Copy xSetIter's current element to xNewVector.
        Increment xSetIter.
      }
      else
      {
        Copy xVectorIter's current element to xNewVector.
        Increment xVectorIter.
      }
      Jump to the top of the loop.
    }
  }
  else
  {
    Copy xSetIter's current element to xNewVector.
    Increment xSetIter.
    Jump to the top of the loop.
  }
}
Set m_nDeletedEntries equal to zero.
Swap the buffers of m_xVector and xNewVector. Do this with
a call to m_xVector.swap( ).
Remove all of m_xSet's entries.
return nSetSize.
```

What is claimed is:

1. A method, comprising:
receiving, in a first container, original data comprising one or more keys, the first container comprising a set container class of a standard template library and having a tree-based data structure comprising a plurality of nodes and a plurality of pointers;
allocating a block of memory to a second container;
copying the original data from the first container to the second container, the second container having an array-based data structure;
deleting the original data, the plurality of nodes, and the plurality of pointers from the first container;
receiving, in the first container after deleting the original data, additional data comprising one or more additional keys;
determining whether a desired key is in the second container;
determining whether the desired key is in the first container based on determining that the desired key is not in the second container; and
returning the desired key based on determining that the desired key is in either the second container or the first container.

2. The method of claim 1, further comprising:
copying the additional data from the first container to the second container; and
deleting the additional data from the first container.

3. The method of claim 1, further comprising:
determining whether the additional data is in the second container;
determining if the additional data has been marked as deleted in the second container; and
removing a marked-as-deleted flag, based on determining that the additional data has been marked as deleted.

4. The method of claim 1, wherein the first container is fully populated before the original data is copied to the second container.

5. The method of claim 1, wherein the first and second containers are transparent to a user.

6. The method of claim 1, further comprising reading the original data in the first container in a sorted order.

7. The method of claim 1, further comprising:
determining whether a desired key is in the second container;
marking the desired key as deleted, based on determining that the desired key is in the second container;
determining whether the desired key is in the first container, based on determining that the desired key is not in the second container; and
deleting the desired key, based on determining that the desired key is in the first container.

8. The method of claim 1, further comprising:
reading a first key from the first container;
reading a second key from the second container;
determining whether the first key or the second key is first in an order; and
setting the first container as current based on determining that the first key is first in the order or setting the second container as current based on determining that the second key is first in the order.

9. The method of claim 8, wherein:
- a calling program reads the first key from the first container based on determining that the first key is first in the order; and
- the calling program reads the second key from the second container based on determining that the second key is first in the order.

10. Logic encoded in non-transitory, tangible computer-readable media and when executed on a processor performing operations comprising:
- receiving, in a first container, original data comprising one or more keys, the first container comprising a set container class of a standard template library and having a tree-based data structure comprising a plurality of nodes and a plurality of pointers;
- allocating a block of memory to a second container;
- copying the original data from the first container to the second container, the second container having an array-based data structure;
- deleting the original data, the plurality of nodes, and the plurality of pointers from the first container;
- receiving, in the first container after deleting the original data, additional data comprising one or more additional keys;
- determining whether a desired key is in the second container;
- determining whether the desired key is in the first container based on determining that the desired key is not in the second container; and
- returning the desired key based on determining that the desired key is in either the second container or the first container.

11. The logic encoded in non-transitory, tangible computer-readable media of claim 10, and when executed performing operations further comprising:
- copying the additional data from the first container to the second container; and
- deleting the additional data from the first container.

12. The logic encoded in non-transitory, tangible computer-readable media of claim 10, and when executed performing operations further comprising:
- determining whether the additional data is in the second container;
- determining whether the additional data has been marked as deleted; and
- removing a marked-as-deleted flag, based on determining that the additional data has been marked as deleted.

13. The logic encoded in non-transitory, tangible computer-readable media of claim 10, wherein the first container is fully populated before the original data is copied to the second container.

14. The logic encoded in non-transitory, tangible computer-readable media of claim 10, wherein the first and second containers are transparent to a user.

15. The logic encoded in non-transitory, tangible computer-readable media of claim 10, and when executed performing operations further comprising reading the original data in the first container in a sorted order.

16. The logic encoded in non-transitory, tangible computer-readable media of claim 10, and when executed performing operations further comprising:
- determining whether a desired key is in the second container;
- marking the desired key as deleted, based on determining that the desired key is in the second container;
- determining whether the desired key is in the first container, based on determining that the desired key is not in the second container; and
- deleting the desired key, based on determining that the desired key is in the first container.

17. The logic encoded in non-transitory, tangible computer-readable media of claim 10, and when executed performing operations further comprising:
- reading a first key from the first container;
- reading a second key from the second container;
- determining whether the first key or the second key is first in an order;
- setting the first container as current based on determining that the first key is first in the order or setting the second container as current based on determining that the second key is first in the order.

18. The logic encoded in non-transitory, tangible computer-readable media of claim 17, wherein:
- a calling program reads the first key from the first container based on determining that the first key is first in the order; and
- the calling program reads the second key from the second container based on determining that the second key is first in the order.

19. A system, comprising:
- one or more memory units for storing instructions; and
- a processor to execute the instructions, the instructions when executed performing operations comprising:
  - receiving, in a first container, original data comprising one or more keys, the first container comprising a set container class of a standard template library and having a tree-based data structure comprising a plurality of nodes and a plurality of pointers;
  - allocating a block of memory to a second container;
  - copying the original data from the first container to the second container, the second container having an array-based data structure;
  - deleting the original data, the plurality of nodes, and the plurality of pointers from the first container;
  - receiving, in the first container after deleting the original data, additional data comprising one or more additional keys;
  - determining whether a desired key is in the second container;
  - determining whether the desired key is in the first container based on determining that the desired key is not in the second container; and
  - returning the desired key based on determining that the desired key is in either the second container or the first container.

20. The system of claim 19, wherein the instructions when executed perform operations further comprising:
- copying the additional data from the first container to the second container; and
- deleting the additional data from the first container.

21. The system of claim 19, wherein the instructions when executed perform operations further comprising:
- determining whether the additional data is in the second container;
- determining if the additional data has been marked as deleted in the second container; and
- removing a marked-as-deleted flag, based on determining that the additional data has been marked as deleted.

22. The system of claim 19, wherein the first container is fully populated before the original data is copied to the second container.

23. The system of claim 19, wherein the first and second containers are transparent to a user.

24. The system of claim 19, wherein the instructions when executed perform operations further comprising reading the original data in the first container in a sorted order.

25. The system of claim 19, wherein the instructions when executed perform operations further comprising:
- determining whether a desired key is in the second container;
- marking the desired key as deleted, based on determining that the desired key is in the second container;
- determining whether the desired key is in the first container, based on determining that the desired key is not in the second container; and
- deleting the desired key, based on determining that the desired key is in the first container.

26. The system of claim 19, wherein the instructions when executed perform operations further comprising:
- reading a first key from the first container;
- reading a second key from the second container;
- determining whether the first key or the second key is first in an order; and
- setting the first container as current based on determining that the first key is first in the order or setting the second container as current based on determining that the second key is first in the order.

27. The system of claim 26, wherein:
- a calling program reads the first key from the first container based on determining that the first key is first in the order; and
- the calling program reads the second key from the second container based on determining that the second key is first in the order.

\* \* \* \* \*